US011153542B2

(12) United States Patent
Kitakami et al.

(10) Patent No.: US 11,153,542 B2
(45) Date of Patent: Oct. 19, 2021

(54) VIDEO PROJECTION CONTROL APPARATUS, VIDEO PROJECTION CONTROL METHOD, PROGRAM, AND VIDEO PROJECTION APPARATUS

(71) Applicant: SONY SEMICONDUCTOR SOLUTIONS CORPORATION, Kanagawa (JP)

(72) Inventors: Yukinojo Kitakami, Kanagawa (JP); Masashi Nakamura, Tokyo (JP)

(73) Assignee: Sony Semiconductor Solutions Corporation, Kanagawa (JP)

(*) Notice: Subject to any disclaimer, the term of this patent is extended or adjusted under 35 U.S.C. 154(b) by 0 days.

(21) Appl. No.: 16/640,917

(22) PCT Filed: Aug. 17, 2018

(86) PCT No.: PCT/JP2018/030491
§ 371 (c)(1),
(2) Date: Feb. 21, 2020

(87) PCT Pub. No.: WO2019/044537
PCT Pub. Date: Mar. 7, 2019

(65) Prior Publication Data
US 2020/0204770 A1 Jun. 25, 2020

(30) Foreign Application Priority Data
Aug. 31, 2017 (JP) .............................. JP2017-166873

(51) Int. Cl.
H04N 9/31 (2006.01)
G02B 26/10 (2006.01)
G03B 21/20 (2006.01)

(52) U.S. Cl.
CPC ............ H04N 9/3182 (2013.01); G02B 26/10 (2013.01); G03B 21/208 (2013.01); G03B 21/2033 (2013.01); H04N 9/3135 (2013.01)

(58) Field of Classification Search
CPC ....... H04N 9/31; H04N 9/3182; H04N 9/3135; G02B 26/10; G03B 21/2033; G03B 21/208
(Continued)

(56) References Cited

U.S. PATENT DOCUMENTS 7,835,409 B2 * 11/2010 Mizuuchi ............. G03B 21/005
372/25
7,938,541 B2 * 5/2011 Mizushima .......... H04N 9/3161
353/31
(Continued)

FOREIGN PATENT DOCUMENTS

JP 2009-229596 10/2009
JP 2009-229596 A * 10/2009 ............. G02B 27/18
(Continued)

OTHER PUBLICATIONS

International Search Report prepared by the Japan Patent Office dated Oct. 26, 2018, for International Application No. PCT/JP2018/030491.

Primary Examiner — Trang U Tran
(74) Attorney, Agent, or Firm — Sheridan Ross P.C.

(57) ABSTRACT

The present disclosure relates to a video projection control apparatus, a video projection control method, a program, and a video projection apparatus that enable a more effective countermeasure against a speckle noise. A calculating part calculates projection signal data to project video using a laser beam as a light source, from video signal data, a correcting part applies, to the projection signal data, a correction process of shifting a wavelength of the laser beam for, for example, each frame of the video for projection, and
(Continued)

a converting part converts the projection signal data into a driving current supplied to the laser light source. In addition, the laser light source has a property that the wavelength shifts in accordance with an emission intensity employed when the laser light is emitted. The present technique is applicable to, for example, a video projection apparatus that uses a laser beam as its light source.

17 Claims, 15 Drawing Sheets

(58) Field of Classification Search
USPC .................................................. 348/760, 744
See application file for complete search history.

(56) References Cited

U.S. PATENT DOCUMENTS 8,111,336 B2\* 2/2012 Freeman .............. H04N 9/3194
348/746
2010/0245773 A1 9/2010 Arita

FOREIGN PATENT DOCUMENTS

JP 2012-008193 1/2012
WO WO 2009/028438 3/2009

\* cited by examiner

FIG.2
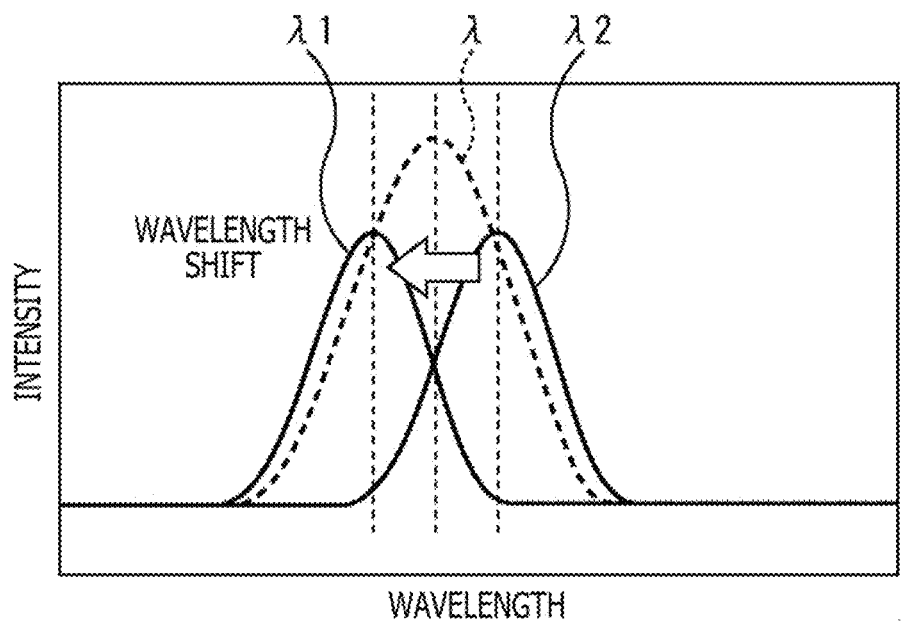
FIG.3
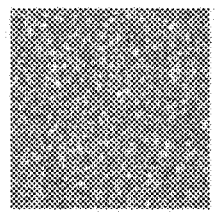 + 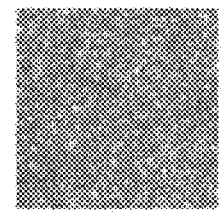

VIDEO PROJECTION CONTROL APPARATUS, VIDEO PROJECTION CONTROL METHOD, PROGRAM, AND VIDEO PROJECTION APPARATUS

CROSS REFERENCE TO RELATED APPLICATIONS

This application is a national stage application under 35 U.S.C. 371 and claims the benefit of PCT Application No. PCT/JP2018/030491 having an international filing date of 17 Aug. 2018, which designated the United States, which PCT application claimed the benefit of Japanese Patent Application No. 2017-166873 filed 31 Aug. 2017, the entire disclosures of each of which are incorporated herein by reference.

TECHNICAL FIELD

The present disclosure relates to a video projection control apparatus, a video projection control method, a program, and a video projection apparatus and, more particularly, to a video projection control apparatus, a video projection control method, a program, and a video projection apparatus that each are enabled to take a more effective countermeasure against a speckle noise.

BACKGROUND ART

A laser beam scanning-type projector has conventionally been developed that projects video by causing a laser beam output from a laser light source to two-dimensionally scan by a MEMS mirror that is manufactured using a MEMS (Micro Electro Mechanical Systems) technique. Moreover, such apparatuses have also been developed as a laser beam illumination-type projector that uses a laser beam as illumination, and a laser light source display that uses a laser beam as a light source.

Relating to the above, because a laser light source has high coherency, an interference pattern that is a spot pattern called "speckle noise" is generated in the video projected onto a projection surface such as a screen. Fine gradations are generated by the generation of the speckle noise and, as a result, the resolution of the video is degraded.

For example, PTL 1 discloses a projection apparatus that reduces the speckle noise by wavelength multiplexing of using a plurality of laser light sources for each of R, G, and B, and that can display high quality video.

CITATION LIST

Patent Literature

[PTL 1]
Japanese Patent Laid-Open No. 2016-218181

SUMMARY

Technical Problem

Relating to the above, it is difficult to state that even the projection apparatus disclosed in the above PTL 1 sufficiently takes a countermeasure against the speckle noise, and a further effective countermeasure against the speckle noise is demanded.

The present disclosure was conceived in view of the above circumstances, and enables a more effective countermeasure against a speckle noise to be taken.

Solution to Problem

A video projection control apparatus in an aspect of the present disclosure includes: a calculating part that calculates projection signal data to project video for projection using, as a light source, a laser beam output from a laser light source, from video signal data of input video, the laser light source having a property that a wavelength shifts in accordance with an emission intensity employed when the laser beam is emitted; a correcting part that applies, to the projection signal data, a correction process of shifting the wavelength of the laser beam in a predetermined modulation unit; and a converting part that converts the projection signal data to which the correction process is applied into electric current data of a driving current to be supplied to the laser light source.

A video projection control method or a program in an aspect of the present disclosure includes: calculating projection signal data to project video for projection using, as a light source, a laser beam output from a laser light source, from video signal data of input video, the laser light source having a property that a wavelength shifts in accordance with an emission intensity employed when the laser beam is emitted; applying, to the projection signal data, a correction process of shifting the wavelength of the laser beam in a predetermined modulation unit; and converting the projection signal data to which the correction process is applied into electric current data of a driving current to be supplied to the laser light source.

A video projection apparatus in an aspect of the present disclosure includes: a laser light source that has a property that a wavelength shifts in accordance with an emission intensity employed when a laser beam is emitted; a calculating part that calculates projection signal data to project video for projection using, as a light source, the laser beam output from the laser light source, from video signal data of input video; a correcting part that applies, to the projection signal data, a correction process of shifting the wavelength of the laser beam in a predetermined modulation unit; and a converting part that converts the projection signal data to which the correction process is applied into electric current data of a driving current to be supplied to the laser light source.

In an aspect of the present disclosure, projection signal data to project the video for projection using, as a light source, a laser beam output from a laser light source having a property that the wavelength shifts in accordance with the emission intensity employed when the laser beam is emitted is calculated from the video signal data of the input video, a correction process of shifting the wavelength of the laser beam in predetermined modulation units is applied to the projection signal data, and the projection signal data to which the correction process is applied is converted into electric current data of a driving current to be supplied to the laser light source.

Advantageous Effect of Invention

According to an aspect of the present disclosure, a more effective countermeasure against a speckle noise can be taken.

BRIEF DESCRIPTION OF DRAWINGS

FIG. 2 is a diagram explaining a wavelength shift.

FIG. 3 is a diagram explaining interference patterns by laser beams having different wavelengths.

DESCRIPTION OF EMBODIMENTS

Specific embodiments to which the present technique is applied will be described below in detail with reference to the drawings.

First Example of Configuration of Video Projection Apparatus

Figure 1:
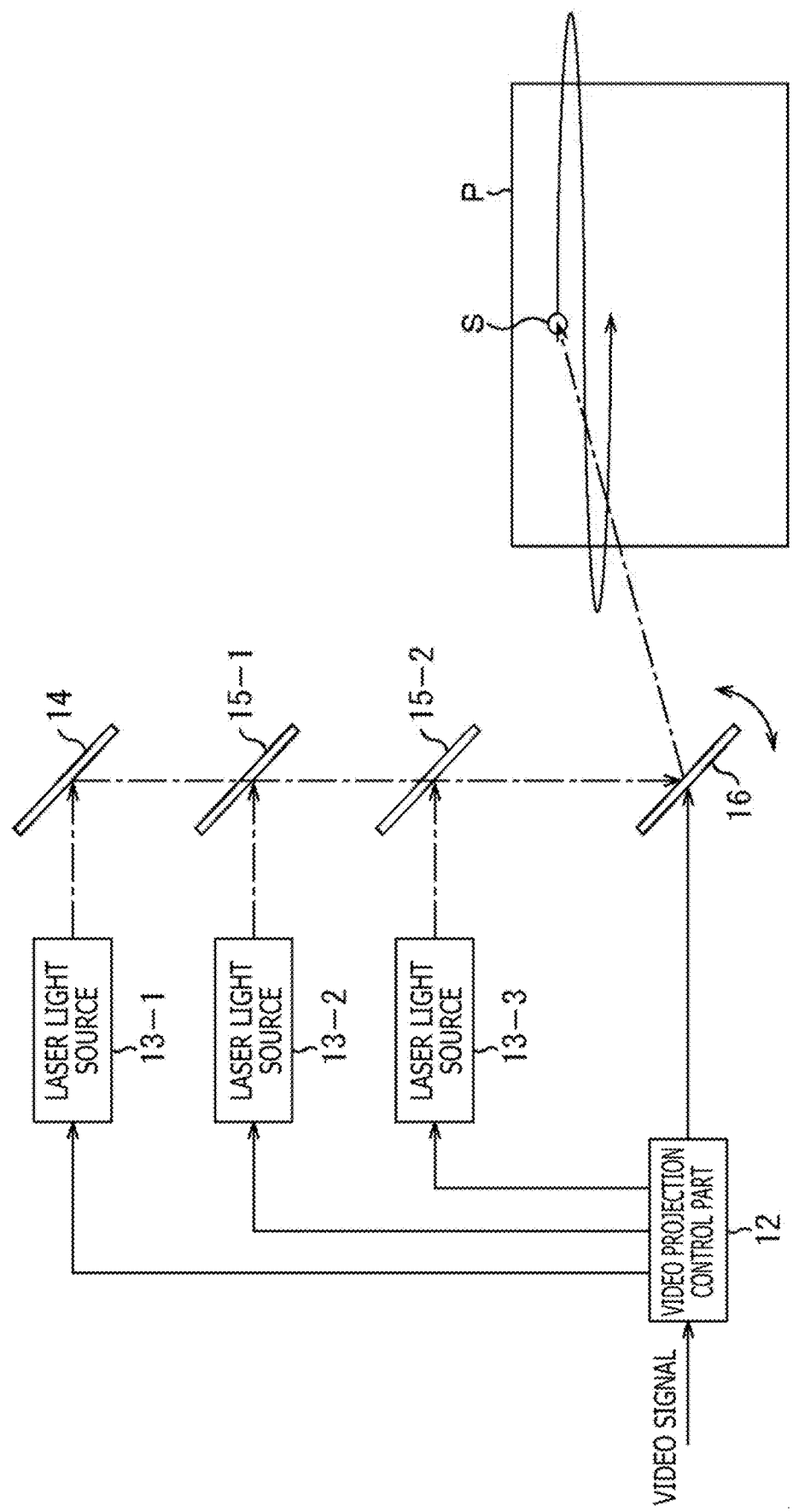
FIG. 1 is a block diagram depicting an example of a configuration of a first embodiment of a video projection apparatus to which the present technique is applied.

FIG. 1 is a block diagram depicting an example of the configuration of a first embodiment of a video projection apparatus to which the present technique is applied.

The video projection apparatus 11 depicted in FIG. 1 is a what-is-called laser beam scanning-type projector and includes a video projection control part 12, laser light sources 13-1 to 13-3, a mirror 14, dichroic mirrors 15-1 and 15-2, and a MEMS mirror 16.

The video projection control part 12 drives the laser light sources 13-1 to 13-3 and the MEMS mirror 16 in accordance with video signal data of input video that is video reproduced by an external reproduction apparatus not depicted and input into the video projection control part 12, and thereby controls projection of the video. For example, the video projection control part 12 controls emission timings of the laser beams of the laser light sources 13-1 to 13-3 such that video in accordance with the video signal data of the input video is projected, and controls a scanning timing of the MEMS mirror 16 that causes these laser beams to scan.

Furthermore, the video projection control part 12 can control an emission intensity employed when each of the laser light sources 13-1 to 13-3 emits the laser beam. For example, the video projection control part 12 controls the emission intensity of the laser beam for each one drawing clock as a unit, each one drawing line as a unit, or each one frame of the video as a unit to draw the video projected by causing the laser beams to scan.

The laser light sources 13-1 to 13-3 each output a laser beam that acts as a light source to project the video by the video projection apparatus 11. For example, the laser light source 13-1 outputs a laser beam in a wavelength region for a red color, the laser light source 13-2 outputs a laser beam in a wavelength region for a green color, and the laser light source 13-3 outputs a laser beam in a wavelength region for a blue color. Moreover, the laser light sources 13-1 to 13-3 can emit the laser beams each at the emission intensity in accordance with the control by the video projection control part 12.

The mirror 14 reflects the laser beam output from the laser light source 13-1 toward the MEMS mirror 16.

The dichroic mirrors 15-1 and 15-2 each reflect only a light beam in a predetermined wavelength region and each transmit therethrough light beams in other wavelength regions. The dichroic mirror 15-1 is disposed on an optical axis from the mirror 14 toward the MEMS mirror 16, reflects the laser beam in the wavelength region output by the laser light source 13-2 toward the MEMS mirror 16, and transmits therethrough the laser beam in the wavelength region output by the laser light source 13-1. The dichroic mirror 15-2 is disposed on the optical axis from the mirror 14 toward the MEMS mirror 16, reflects the laser beam in the wavelength region output by the laser light source 13-3 toward the MEMS mirror 16, and transmits therethrough the laser beams in the wavelength regions output from the laser light sources 13-1 and 13-2. In this manner, the laser beams reflected by the mirror 14 and the dichroic mirrors 15-1 and 15-2 enter into the MEMS mirror 16 along the same optical axis.

The MEMS mirror 16 is a scanning part that causes the laser beams output from the laser light sources 13-1 to 13-3 to two-dimensionally scan toward the direction of a surface that is orthogonal to an optical axis along which the video is projected by the video projection apparatus 11 by driving its reflective surface that reflects the laser beams.

The video projection apparatus 11 is configured as above and, for example, a spot S formed by the projection of the laser beams output from the laser light sources 13-1 to 13-3 onto a projection surface such as a screen is caused to scan by the MEMS mirror 16, and video P can thereby be drawn on the screen.

Concerning the above, the laser light sources 13-1 to 13-3 can each output the laser beam having the wavelength of the corresponding color at a predetermined emission intensity, and each have the property that the wavelength of the laser beam to be output varies (wavelength-shifts) in accordance with the emission intensity employed when the laser beam is emitted.

The wavelength shift of the laser beam will be described with reference to FIG. 2. Additionally, hereinafter, in a case where the laser light sources 13-1 to 13-3 do not need to be distinguished from each other, the laser light sources 13-1 to 13-3 will appropriately be simply referred to as "laser light source 13."

For example, when a predetermined emission intensity is employed, the laser light source 13 can emit a laser beam having a prescribed wavelength $\lambda$. Additionally, assuming that the wavelength $\lambda$ at this time corresponds to 100%, the laser light source 13 can output a laser beam having a wavelength $\lambda1$ that has a wavelength shift of 70% generated therein and a laser beam having a wavelength $\lambda2$ that has a wavelength shift of 130% generated therein, in accordance with the emission intensity employed when the laser beam is emitted.

Concerning the above, as described above, because the laser beam has high coherency, an interference pattern called "speckle noise" is generated on the projection surface onto which the video is projected. Additionally, the interference pattern varies with the wavelength of the laser beam and can be planarized by superimposing thereon a different interference pattern.

For example, as depicted in FIG. 3, an interference pattern generated on the projection surface by the laser beam having the wavelength $\lambda1$ and an interference pattern generated on the projection surface by the laser beam having the wavelength $\lambda2$ are different from each other. Additionally, when these interference patterns are superimposed spatially or temporarily on each other, the interference patterns are consequently planarized and, as a result, the speckle noise can be reduced.

For example, with the video projection method of projecting the video by causing the laser beams to scan, because the laser beam can directly be modulated, the video projection apparatus 11 can generate a wavelength shift in each of the laser beams for each one drawing clock as a unit at the minimum. Otherwise, the video projection apparatus 11 may generate a wavelength shift in the laser beam for each one drawing line as a unit, and can generate a wavelength shift in the laser beam for each one frame as a unit at the maximum.

Moreover, in the video projection apparatus 11, each one drawing clock to draw one pixel of the video to be projected is different from the clock of the input video. This is because, in the video projection apparatus 11, a scanning timing at which the MEMS mirror 16 causes the laser beam to scan is asynchronous with the clock of the input video. Furthermore, in the video projection apparatus 11, the MEMS mirror 16 resonantly operates and the display time period per one pixel of the video projected by causing the laser beam to scan by the MEMS mirror 16 is different from the display time period per one pixel of the input video.

Additionally, in a case where the spot formed by the laser beams for each one drawing clock in the video projected by the video projection apparatus 11 is larger than one pixel of the video, the spots adjacent to each other consequently overlap on each other in the longitudinal direction and the lateral direction of the video.

Figure 4:
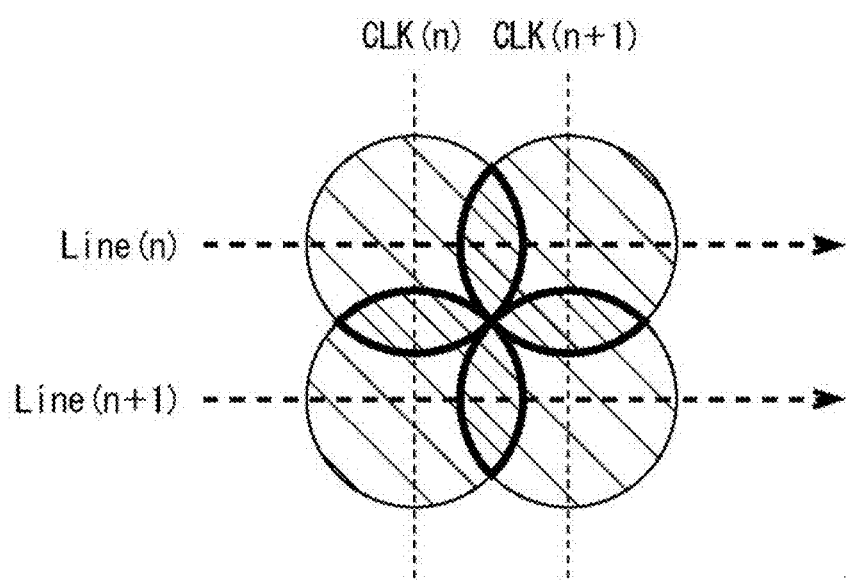
FIG. 4 is a diagram explaining overlapping of spots.

For example, circles depicted in FIG. 4 each represent the size (the beam diameter) of the spot formed for each one drawing clock by the laser beams output from the video projection apparatus 11. The video projection apparatus 11 forms the spot for each one drawing clock, causing the laser beams to scan along the drawing line directed in the lateral direction, and moves the scanning positions of the laser beams in the longitudinal direction for each one drawing line, and thereby draws the video. The spots adjacent to each other therefore consequently have spatial overlapping therebetween as depicted by areas each surrounded by a thick line in FIG. 4.

Modulation is executed such that the wavelengths of the laser beams forming their spots differ from each other in the area having the spots overlapping on each other as above, thereby the interference patterns each generated in the area are superimposed on each other, and thereby the interference patterns are consequently planarized.

<First Noise Reduction Method>

A first noise reduction method of generating a wavelength shift for each one drawing line as a unit will be described with reference to FIG. 5 and FIG. 6.

Figure 5:
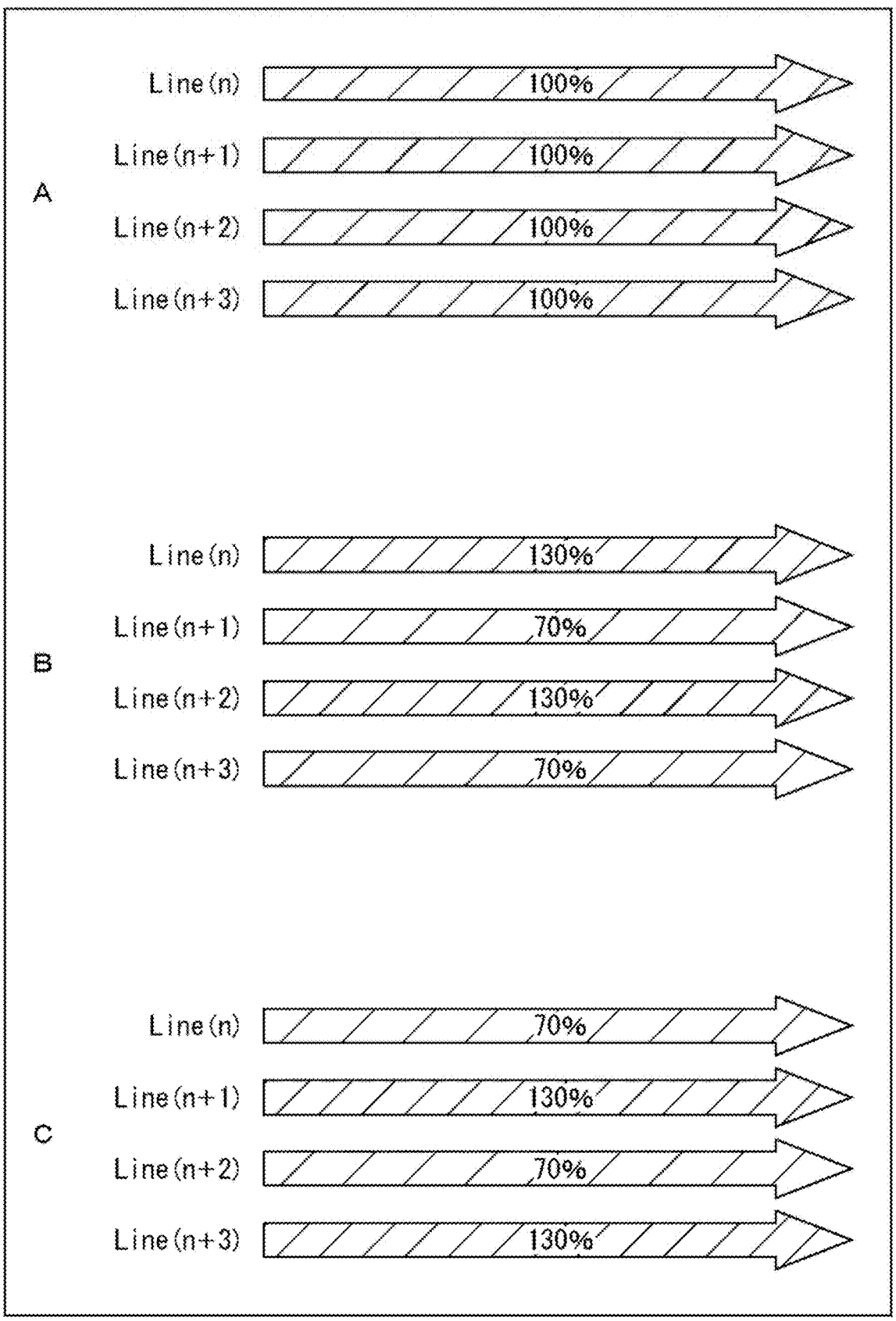
FIG. 5 is a diagram explaining a noise reduction method of generating a wavelength shift for each one drawing line as a unit.

For example, as depicted in A of FIG. 5, the video projection apparatus 11 usually controls the laser light source 13 such that the laser light source 13 emits a laser beam at a prescribed emission intensity, and the laser light source 13 outputs a laser beam having the 100%-wavelength $\lambda$ for each of all the drawing lines.

On the other hand, as depicted in B of FIG. 5 and C of FIG. 5, the video projection apparatus 11 controls the laser light source 13 such that the laser light source 13 varies, for each one drawing line, the emission intensity employed when the laser beam is emitted, and can thereby generate the wavelength shift for each one drawing line with, for example, a correction amount of 30%. For example, as depicted in B of FIG. 5, the laser light source 13 thereby outputs the laser beam having the 70%-wavelength $\lambda1$ for the drawing lines each having an odd number and outputs the laser beam having the 130%-wavelength $\lambda2$ for the drawing lines each having an even number. Moreover, for example, as depicted in C of FIG. 5, the laser light source 13 outputs the laser beam having the 130%-wavelength $\lambda2$ for the drawing lines each having an odd number and outputs the laser beam having the 70%-wavelength $\lambda1$ for the drawing lines each having an even number.

Thereby, in the video projected by the video projection apparatus 11, as described with reference to FIG. 4, the interference patterns by the laser beams having different wavelengths can spatially be superimposed on each other in the longitudinal direction of the video, and reduction of the speckle noise can therefore be facilitated.

Furthermore, the video projection apparatus 11 can cause the interference patterns by the laser beams having the different wavelengths to temporarily be superimposed on each other in the video projected by the video projection apparatus 11 by switching the drawing line to have the wavelength shift generated therein for each one frame as above, and further reduction of the speckle noise can be facilitated. In other words, a correction amount by which the wavelength is shifted for each drawing line can be switched for each one frame.

Figure 6:
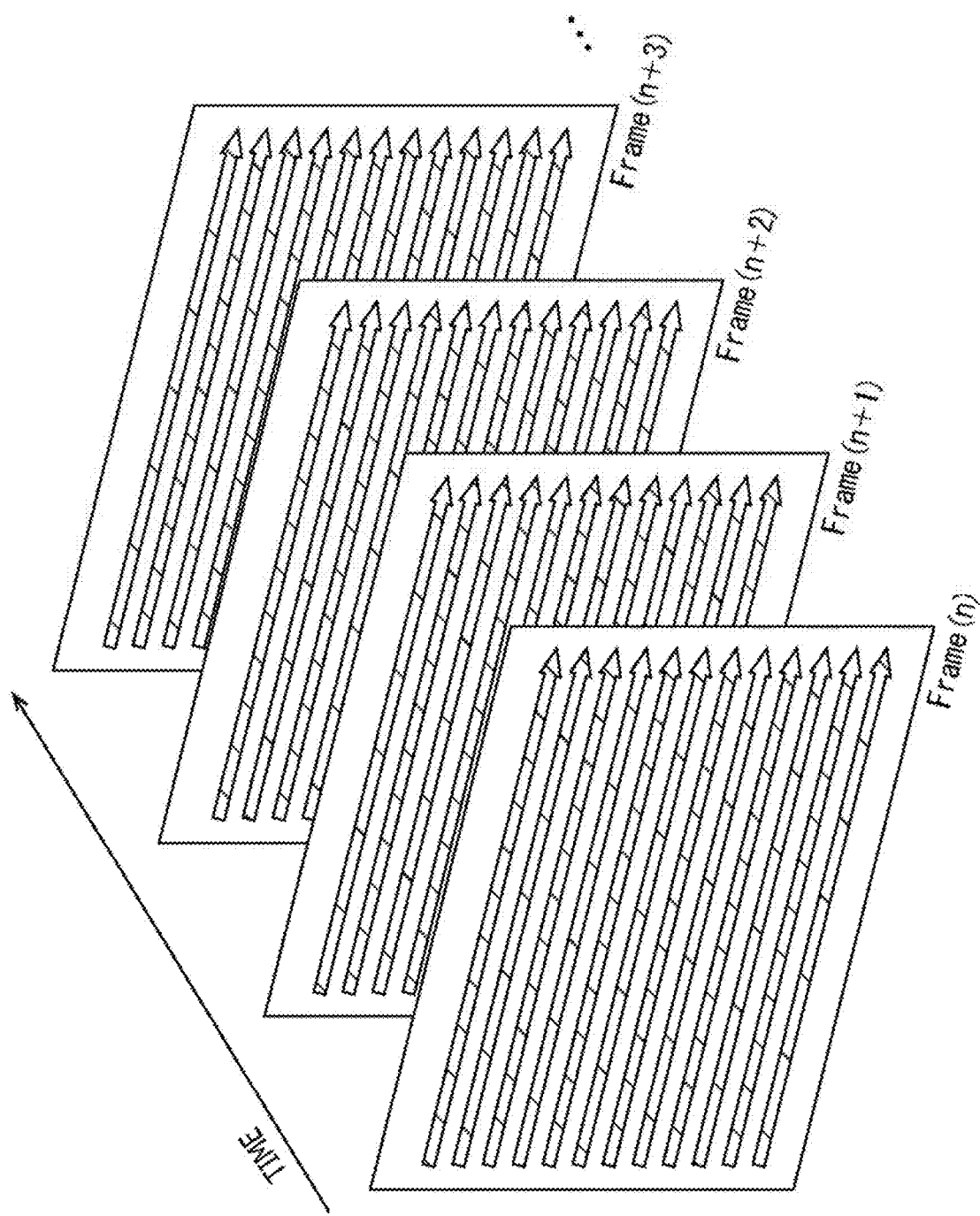
FIG. 6 is a diagram explaining an example where a line in which a wavelength shift is generated is switched alternately for each one frame.

For example, as depicted in FIG. 6, the video projection apparatus 11 controls the laser light source 13 such that the drawing line to have the wavelength shift generated therefor is alternately switched between the one with 70% and the one with 130% for each one frame using the correction amount of 30%. For an even-numbered frame, as depicted in B of FIG. 5, the laser light source 13 thereby outputs the laser beam having the 70%-wavelength $\lambda1$ for each drawing line to be odd-numbered and outputs the laser beam having the 130%-wavelength $\lambda2$ for each drawing line to be even-numbered. Furthermore, for an odd-numbered frame, as depicted in C of FIG. 5, the laser light source 13 outputs the laser beam having the 130%-wavelength $\lambda1$ for a drawing line to be odd-numbered and outputs the laser beam having the 70%-wavelength λ2 for a drawing line to be even-numbered.

As above, the video projection apparatus 11 generates the wavelength shift for each one drawing line as a unit, furthermore, switches the drawing line for each one frame, and can thereby reduce the speckle noise generated in the projected video.

In the above, for the emission intensity for the drawing line to be odd-numbered and the emission intensity for the drawing line to be even-numbered, the video projection apparatus 11 adjusts these emission intensities using a correction amount with which the average of these intensities corresponds to the brightness of the input video (100% of the brightness of the input video is maintained). In other words, using, for example, a correction amount of 30%, the wavelength shift is generated at 130% for each drawing line to be odd-numbered and the wavelength shift is generated at 70% for each drawing line to be even-numbered, and the brightness of 100% of that of the original input video can thereby be kept as a whole by overlapping these drawing lines on each other.

In addition, it is preferred that, when it is assumed that the brightness of the original input video corresponds to 100%, the video projection apparatus 11 vary the emission intensity of the laser beam such that the emission intensity of the laser beam stays in a predetermined range of the brightness using a correction amount with which the emission intensity stays in a range, for example, from 50% to 200%. For example, when the emission intensity of the laser beam varies in this predetermined range, uniform brightness can be established as the overall projected video.

As above, the video projection apparatus 11 modulates the one laser beam output from the laser light source 13 for each drawing line (more specifically, modulates into 641 nm to be 130% and into 639 nm to be 70% when the wavelength before the modulation is 640 nm of a red color), and can thereby reduce the speckle noise by the superimposition of the drawing lines on each other.

<Second Noise Reduction Method>

A second noise reduction method of generating a wavelength shift for each one drawing clock as a unit will be described with reference to FIG. 7.

Figure 7:
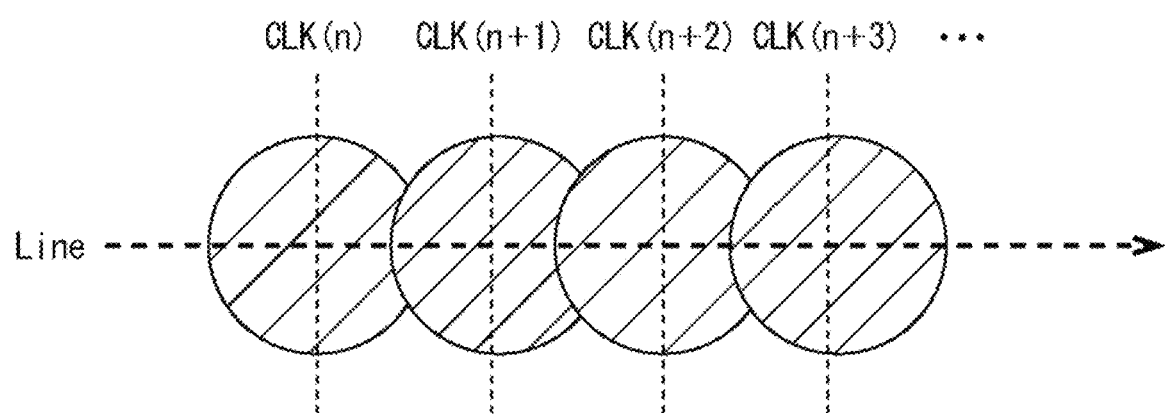
FIG. 7 is a diagram explaining a noise reduction method of generating a wavelength shift in each one drawing clock as a unit.

Similar to FIG. 4, FIG. 7 depicts the size of the spot formed for each one drawing clock using circles, and the video projection apparatus 11 can generate a wavelength shift for each one drawing clock. For example, the video projection apparatus 11 can cause, using a correction amount 30%, a laser beam having the 130%-wavelength λ2 to be output at a drawing clock to be odd-numbered and can cause a laser beam having the 70%-wavelength λ1 to be output at a drawing clock to be even-numbered. Moreover, the video projection apparatus 11 can control the laser light source 13 such that the laser light source 13 switches the drawing clock to have the wavelength shift between 70% and 130% generated, for each drawing line or each one frame.

In the video projected by the video projection apparatus 11, the interference patterns by the laser beams having the different wavelengths can thereby be caused to be superimposed on each other spatially in the lateral direction and the longitudinal direction of the video or temporarily concerning the video, and reduction of the speckle noise can therefore be facilitated.

<Third Noise Reduction Method>

A third noise reduction method of generating a wavelength shift for each one frame as a unit will be described with reference to FIG. 8.

Figure 8:
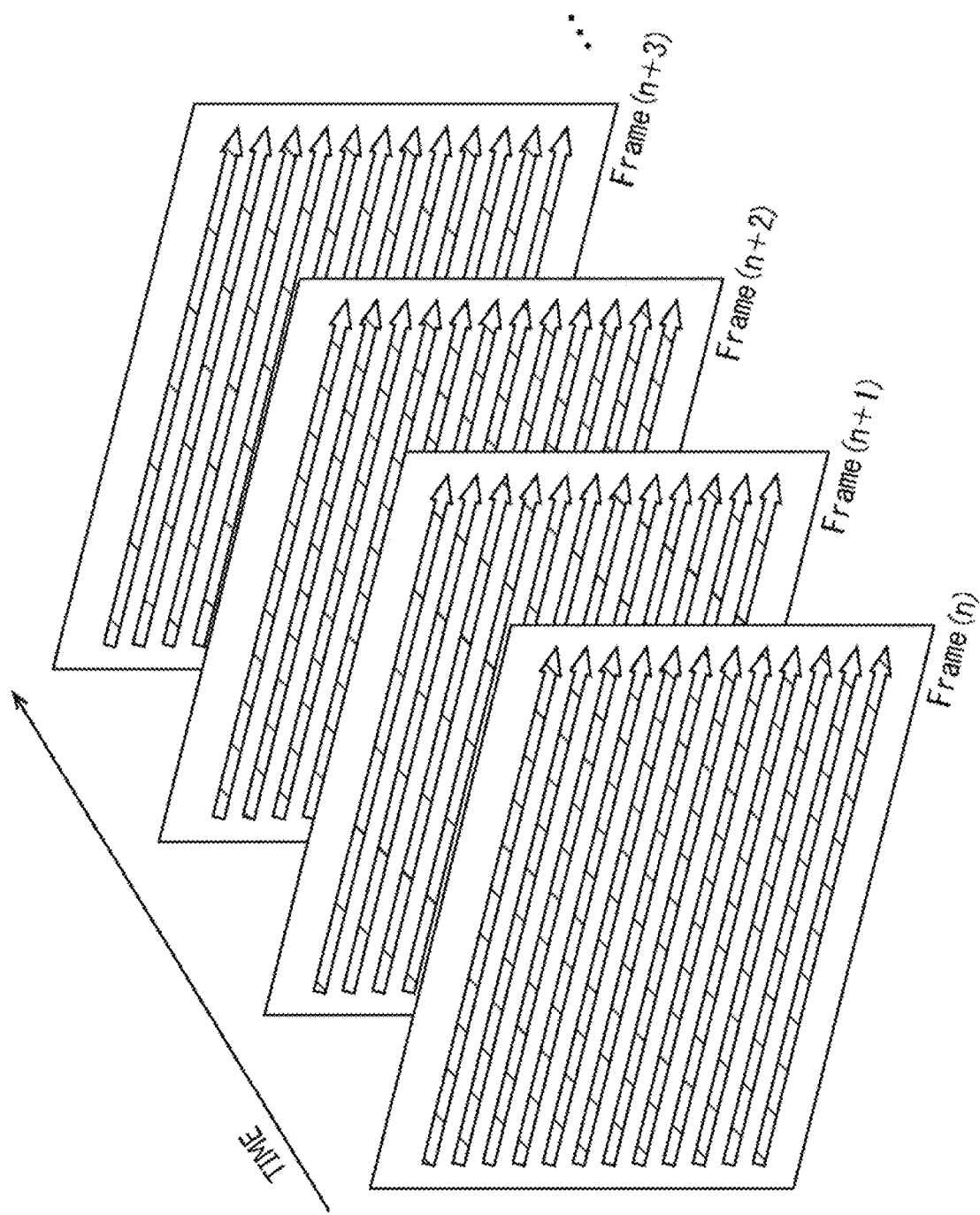
FIG. 8 is a diagram explaining a noise reduction method of generating a wavelength shift for each one frame as a unit.

As depicted in FIG. 8, the video projection apparatus 11 can generate a wavelength shift for each one frame of the video. For example, using a correction amount of 30%, the video projection apparatus 11 can cause a laser beam having the 70%-wavelength λ2 to be output for an odd-numbered frame and can cause a laser beam having the 130%-wavelength λ2 to be output for an even-numbered frame.

In the video projected by the video projection apparatus 11, the interference patterns by the laser beams having the different wavelengths can thereby be caused to be superimposed on each other temporarily concerning the video, and reduction of the speckle noise can therefore be facilitated.

First Example of Configuration of Video Projection Control Part

Figure 9:
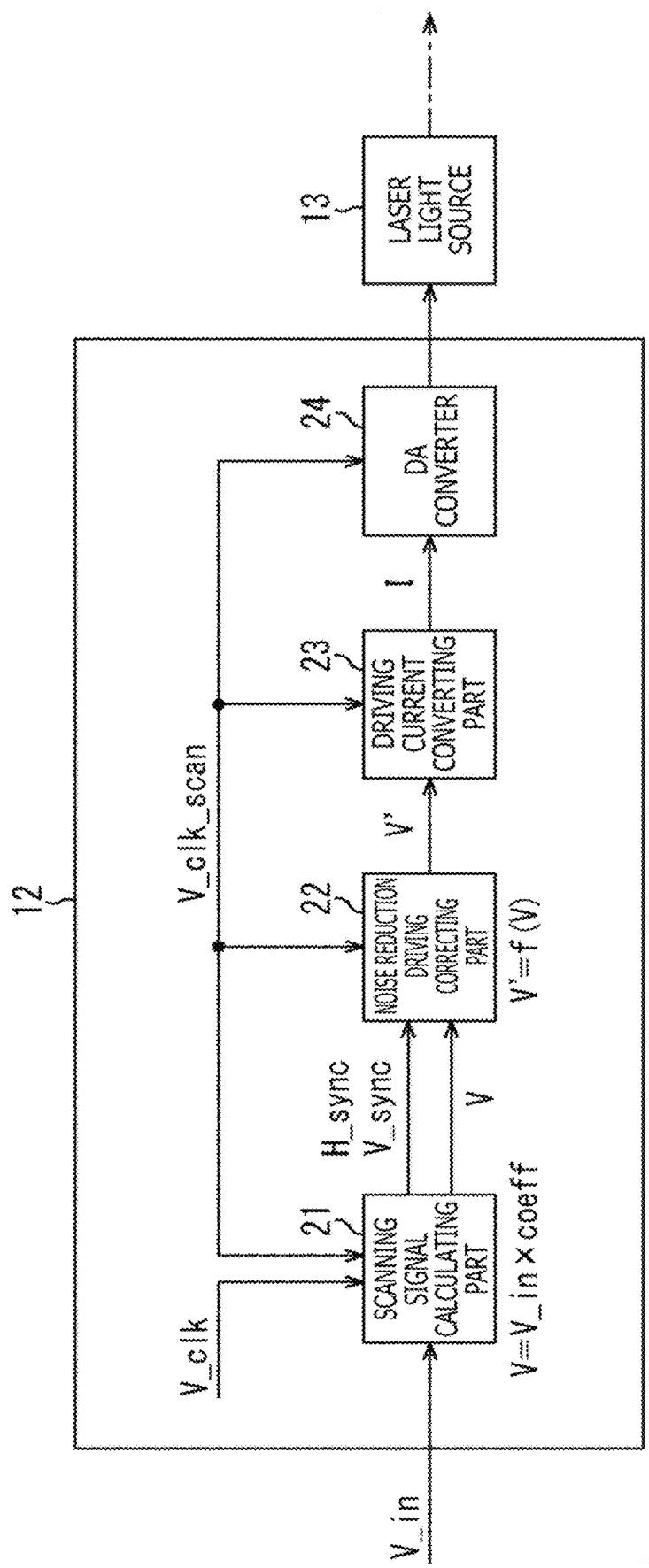
FIG. 9 is a block diagram depicting a first example of a configuration of a video projection control part.

FIG. 9 is a block diagram depicting a first example of a configuration of the video projection control part 12.

As depicted in FIG. 9, the video projection control part 12 includes a scanning signal calculating part 21, a noise reduction driving correcting part 22, a driving current converting part 23, and a DA (Digital to Analog) converter 24. Moreover, in the video projection control part 12, a clock signal V_clk indicating a timing for each pixel of the input video is supplied to the scanning signal calculating part 21. Moreover, in the video projection control part 12, a scanning clock signal V_clk_scan indicating a timing for one pixel employed when the video is drawn by causing the laser beams to scan is supplied to the scanning signal calculating part 21, the noise reduction driving correcting part 22, the driving current converting part 23, and the DA converter 24.

The scanning signal calculating part 21 calculates scanning pixel data V for each one drawing clock of the video projected by causing the laser beams to scan by the video projection apparatus 11, from video pixel data V_in for each one pixel included in the input video that is input into the video projection control part 12 (V=V_in×coeff). The scanning signal calculating part 21 thereafter supplies a vertical synchronization signal V_sync and a horizontal synchronization signal H_sync of the input video together with the scanning pixel data V, to the noise reduction driving correcting part 22.

The noise reduction driving correcting part 22 applies modulation driving correction to generate the wavelength shift that reduces the speckle noise as described above, to the scanning pixel data V supplied from the scanning signal calculating part 21 (V'=f(V)). The noise reduction driving correcting part 22 thereafter supplies corrected scanning pixel data V' to which the modulation driving correction is applied to the driving current converting part 23.

For example, in a case where the wavelength shift is generated for each one frame as a unit (see FIG. 8 described above), the noise reduction driving correcting part 22 executes the modulation driving correction of converting the scanning pixel data V into the corrected scanning pixel data V', using coefficients coeff1 and coeff2 represented in Equation (1) below.

[Math. 1]

$$V' = \begin{cases} V \times coeff1 & \text{for an odd frame} \\ V \times coeff2 & \text{for an even frame} \end{cases} \quad (1)$$

In this regard, (V×coeff1+V×coeff2)/2=V

For example, as described with reference to FIG. 8 described above, it is assumed that the 70%-wavelength shift is generated for an odd-numbered frame and the 130%-wavelength shift is generated for an even-numbered frame. In this case, in Equation (1), a coefficient to generate the wavelength shift at 70% is used as the coefficient coeff1 and a coefficient to generate the wavelength shift at 130% is used as the coefficient coeff2. In this regard, such coefficients are used as the coefficient coeff1 and the coefficient coeff2 with which the video is projected for which the emission intensity acquired when the frames are temporarily superimposed on each other corresponds to the brightness based on the input video (that is, V×coeff1+V×coeff2=V).

Moreover, in a case where the wavelength shift is generated for each one drawing line as a unit (see FIG. 5 described above), the noise reduction driving correcting part 22 executes the modulation driving correction of converting the scanning pixel data V into the corrected scanning pixel data V', using the coefficients coeff1 and the coeff2 represented in Equation (2) below.

[Math. 2]
$$V' = \begin{cases} V \times coeff1 & \text{for an odd line} \\ V \times coeff2 & \text{for an even line} \end{cases} \quad (2)$$

In this regard, (V×coeff1+V×coeff2)/2=V

For example, as described with reference to B of FIG. 5 described above, it is assumed that the 70%-wavelength shift is generated for a drawing line to be odd-numbered and the 130%-wavelength shift is generated for a drawing line to be even-numbered. In this case, in Equation (2), a coefficient to generate the wavelength shift at 70% is used as the coefficient coeff1 and a coefficient to generate the wavelength shift at 130% is used as the coefficient coeff2. In this regard, such coefficients are used as the coefficient coeff1 and the coefficient coeff2 with which the video is projected for which the emission intensity acquired when the frames are temporarily superimposed on each other corresponds to the brightness based on the input video (that is, (V×coeff1+V×coeff2)/2=V). In other words, the correction amount is acquired such that the average of the emission intensities of the laser beams each having the wavelength shift generated therein corresponds to the brightness of the input video.

Moreover, in a case where the wavelength shift is generated for each one clock as a unit (see FIG. 7 described above), the noise reduction driving correcting part 22 executes the modulation driving correction of converting the scanning pixel data V into the corrected scanning pixel data V', using the coefficients coeff1 and the coeff2 represented in Equation (3) below.

[Math. 3]
$$V' = \begin{cases} V \times coeff1 & \text{for an odd } clk \\ V \times coeff2 & \text{for an even } clk \end{cases} \quad (3)$$

In this regard, (V×coeff1+V×coeff2)/2=V

For example, as described with reference to FIG. 7 described above, it is assumed that the 130%-wavelength shift is generated for a drawing clock to be odd-numbered and the 70%-wavelength shift is generated for a drawing clock to be even-numbered. In this case, in Equation (1), a coefficient to generate the wavelength shift at 130% is used as the coefficient coeff1 and a coefficient to generate the wavelength shift at 70% is used as the coefficient coeff2. In this regard, such coefficients are used as the coefficient coeff1 and the coefficient coeff2 with which the video is projected for which the emission intensity acquired when the frames are temporarily superimposed on each other corresponds to the brightness based on the input video (that is, (V×coeff1+V×coeff2)/2=V).

The driving current converting part 23 converts the corrected scanning pixel data V' supplied thereto from the noise reduction driving correcting part 22 into electric current data of a driving current I to be supplied to the laser light source 13, and supplies the electric current data to the DA converter 24.

The DA converter 24 converts the electric current data of the driving current I supplied thereto from the driving current converting part 23 as a digital value into analog data, and supplies the driving current I in a current amount indicated by the electric current data to the laser light source 13.

The video projection control part 12 is configured as above, can supply, to the laser light source 13, the driving current that is corrected by the noise reduction driving correcting part 22 such that the wavelength shift is generated, and can thereby facilitate reduction of the speckle noise as above.

In addition, the example where the wavelength shift is cyclically generated in the two patterns such that the wavelength shift to be generated is switched between those for an even number and an odd number has been described in the above-described example, while the wavelength shift may be cyclically generated in two or more patterns. For example, the noise reduction driving correcting part 22 may apply the modulation driving correction such that the wavelength shift is generated in each of eight wavelengths that are different from each other using eight drawing clocks (or eight drawing lines or eight frames) as one cycle.

It can be anticipated that the effect of reducing the speckle noise is improved by increasing the number of patterns to generate the wavelength shift as above, while it is assumed that the variation of the interference pattern by the wavelength shift becomes small. It is then advantageous to take an appropriate countermeasure against the speckle noise, in which the video projection control part 12 causes the wavelength shift to be generated in patterns from two patterns to eight patterns.

<Video Projection Control Process>

Figure 10:
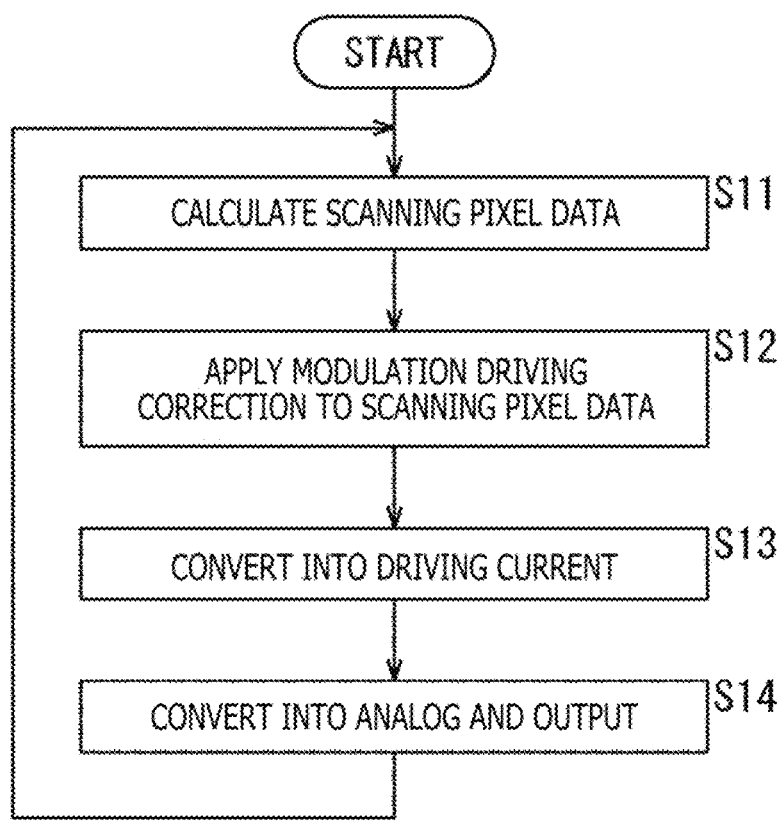
FIG. 10 is a flowchart explaining a video projection control method.

A video projection control process executed by the video projection control part 12 will be described with reference to a flowchart depicted in FIG. 10.

For example, the process is started when the video signal data of the input video is supplied to the video projection control part 12. In step S11, the scanning signal calculating part 21 converts the video pixel data V_in of each one pixel included in the input video that is input into the video projection control part 12, into the scanning pixel data V of each one drawing clock of the video to be projected by causing the laser beams to scan by the video projection apparatus 11.

In step S12, the noise reduction driving correcting part 22 applies the modulation driving correction to the scanning pixel data V converted by the scanning signal calculating part 21 in step S11, and supplies the corrected scanning pixel data V' to the driving current converting part 23.

In step S13, the driving current converting part 23 converts the corrected scanning pixel data V' supplied from the noise reduction driving correcting part 22 in step S12 into the electric current data of the driving current I to be supplied to the laser light source 13, and supplies the electric current data to the DA converter 24.

In step S14, the DA converter 24 converts the electric current data of the driving current I supplied from the driving current converting part 23 as a digital value in step S13 into analog data, and supplies the driving current I in the electric current amount indicated by the electric current data to the laser light source 13.

Additionally, the process returns to step S11 after the process in step S14, and the similar processes are repeatedly executed hereinafter until the supply of the video signal data of the input video is stopped.

As above, the video projection control part 12 can spatially or temporarily superimpose the interference patterns by the laser beams having the different wavelengths on each other, by applying the modulation driving correction to the scanning pixel data. The speckle noise can thereby be reduced and, for example, degradation of the resolution of the video due to the speckle noise can be avoided.

Second Example of Configuration of Video Projection Apparatus

Figure 11:
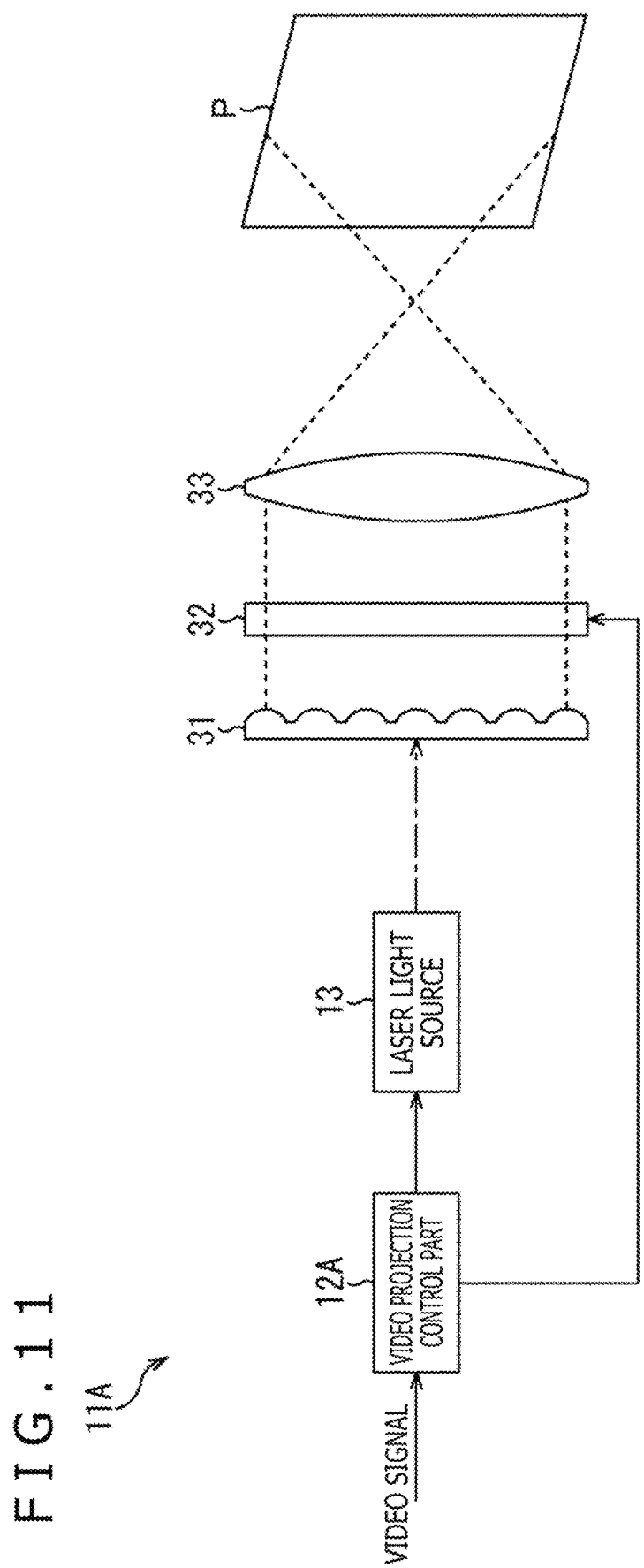
FIG. 11 is a block diagram depicting an example of a configuration of a second embodiment of the video projection apparatus.

FIG. 11 is a block diagram depicting an example of a configuration of a second embodiment of the video projection apparatus to which the present technique is applied.

As depicted in FIG. 11, a video projection apparatus 11A is a what-is-called laser beam illumination-type projector, and includes a video projection control part 12A, a laser light source 13, a diffusing lens 31, a modulation element 32, and a projecting lens 33.

The video projection control part 12A controls the emission intensity of the laser beam output from the laser light source 13 in accordance with the brightness of the input video that is video reproduced by an external reproduction apparatus not depicted and input into the video projection control part 12A, and controls the driving of the modulation element 32 for each pixel in accordance with the input video.

The laser light source 13 outputs a laser beam that is, for example, a white laser beam having the light beams of all the wavelength regions mixed therein, to be used as the illumination to project the video by the video projection apparatus 11A. Moreover, similar to the laser light sources 13-1 to 13-3 in FIG. 1, the laser light source 13 has the property that the wavelength of the laser beam output therefrom varies (wavelength-shifts) in accordance with the emission intensity employed when the laser beam is emitted.

The diffusing lens 31 diffuses the laser beam output from the laser light source 13 such that the laser beam planarly enters into the modulation element 32.

The modulation element 32 outputs the video by, for example, modulating the laser beam planarly entering thereinto through the diffusing lens 31, for each pixel in accordance with the control by the video projection control part 12A.

The projecting lens 33 condenses the planar laser beam transmitted by the modulation element 32 therethrough, thereafter causes the condensed laser beam to provide an image on a projection surface such as a screen not depicted, and thereby projects the video P.

In the video projection apparatus 11A configured as above, the video projection control part 12A causes the laser light source 13 to generate the wavelength shift for each frame of the video and, similar to the video projection apparatus 11 in FIG. 1, can thereby facilitate reduction of the speckle noise.

Second Example of Configuration of Video Projection Control Part

Figure 12:
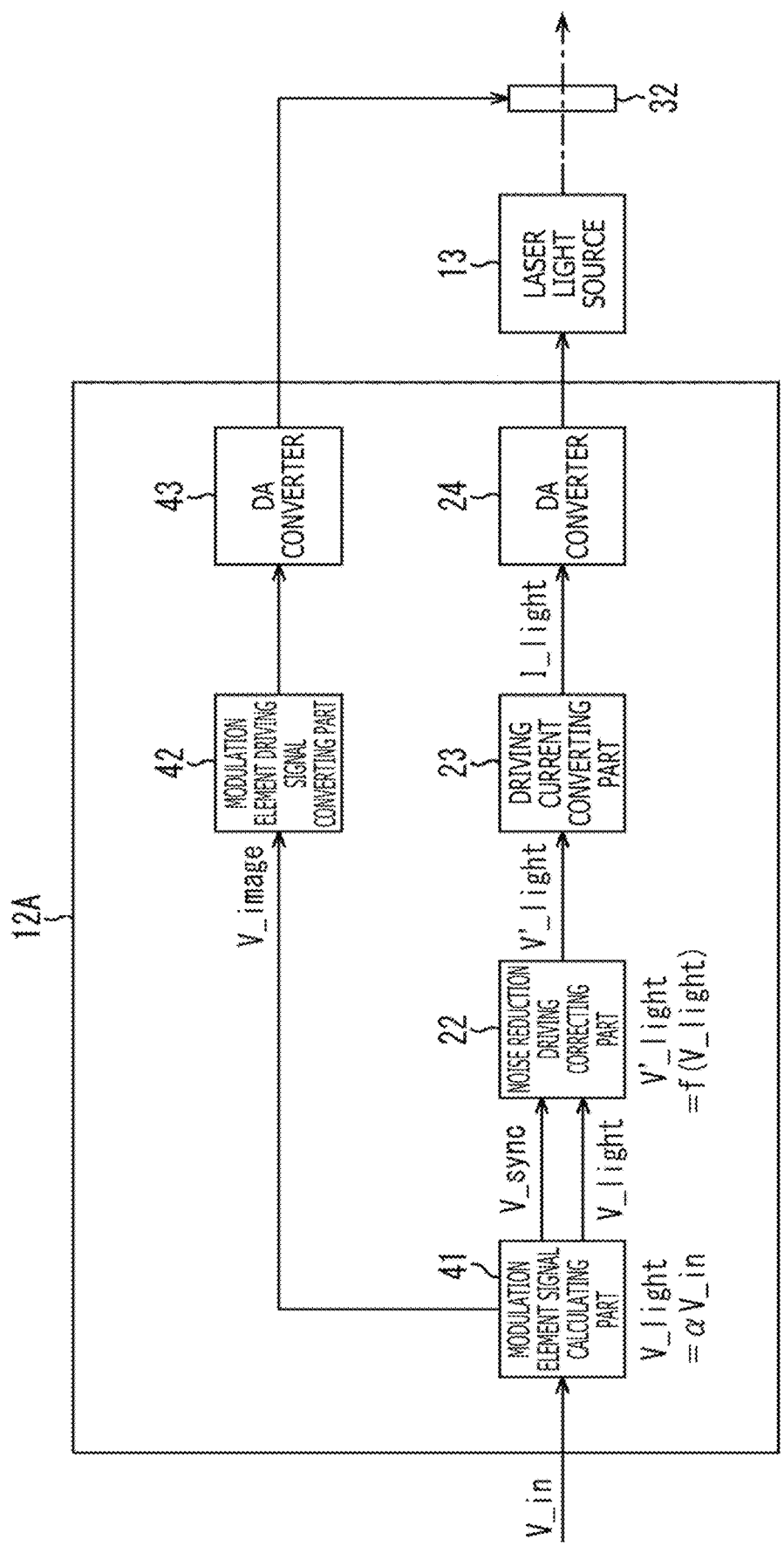
FIG. 12 is a block diagram depicting a second example of the configuration of the video projection control part.

FIG. 12 is a block diagram depicting an example of the configuration of the video projection control part 12A depicted in FIG. 11. In addition, as to the video projection control part 12A depicted in FIG. 12, the blocks thereof that are common to the video projection control part 12 in FIG. 9 will not again be described in detail.

In other words, similar to the video projection control part 12 in FIG. 9, the video projection control part 12A includes the noise reduction driving correcting part 22, the driving current converting part 23, and the DA converter 24. Furthermore, the video projection control part 12A includes a modulation element signal calculating part 41, a modulation element driving signal converting part 42, and a DA converter 43.

The modulation element signal calculating part 41 acquires modulating element data V_image to express the input video using the modulation element 32, from the video pixel data V_in of each one pixel included in the input video input into the video projection control part 12A, and supplies the modulation element data V_image to the modulation element driving signal converting part 42. Moreover, the modulation element signal calculating part 41 calculates light source output data V_light in accordance with the brightness of the overall one frame of the input video from the video pixel data V_in of each one pixel included in the input video input into the video projection control part 12A (V_light=α×V_in). The modulation element signal calculating part 41 thereafter supplies the vertical synchronization signal V_sync of the input video together with the light source output data V_light to the noise reduction driving correcting part 22.

The modulation element driving signal converting part 42 converts the modulation element data V_image supplied thereto from the modulation element signal calculating part 41 into driving signal data to drive the modulation element 32, and supplies the driving signal data to the DA converter 43. The DA converter 43 thereafter converts the driving signal data supplied thereto from the modulation element driving signal converting part 42 as a digital value into analog data, and supplies a driving signal at a voltage indicated by the driving signal data to the modulation element 32.

Moreover, in the video projection control part 12A, the noise reduction driving correcting part 22 applies modulation driving correction to generate the wavelength shift to reduce the speckle noise as described above, to the light source output data V_light supplied thereto from the modulation element signal calculating part 41 (V'_light=f(V_light)). The noise reduction driving correcting part 22 thereafter supplies the corrected light source output data V'_light to which the modulation driving correction is applied, to the driving current converting part 23.

The video projection control part 12A can generate the wavelength shift for each one frame as a unit, and the noise reduction driving correcting part 22 executes the modulation driving correction that converts the light source output data V_light into the corrected light source output data V'_light using coefficients coeff1 and coeff2 represented in Equation (4) below. At this time, such coefficients are used as the coefficient coeff1 and the coefficient coeff2 with which the video is projected for which the emission intensity acquired when the frames are temporarily overlapped on each other corresponds to the brightness based on the input video (that is, (V×coeff1+V×coeff2)/2=V).

[Math. 4]

$$V'\_light = \begin{cases} V\_light \times coeff1 & \text{for an odd frame} \\ V\_light \times coeff2 & \text{for an even frame} \end{cases} \quad (4)$$

In this regard, (V×coeff1+V×coeff2)/2=V

The corrected light source output data V'_light is thereafter converted into the electric current data of the driving current I_light by the driving current converting part 23, the electric current data is converted into analog data by the DA converter 24, and the driving current I_light in the current amount indicated by the electric current data is supplied to the laser light source 13.

The video projection control part 12A is configured as above, and can supply the driving current I_light that is corrected such that the wavelength shift is generated by the noise reduction driving correcting part 22A, to the laser light source 13. The video projection control part 12A can thereby generate the wavelength shift for each frame of the video and, similar to the video projection control part 12, can facilitate reduction of the speckle noise.

In addition, in the case where the wavelength shift is generated for each frame of the video as above, for example, modulation at 30 Hz or higher is desirable considering the temporal resolution of the human eye, and flickering caused by a flicker can be more suppressed as the frequency is increased. Moreover, as described above, in the video projection control part 12A, the generation of the wavelength shift in patterns from two patterns to eight patterns is also advantageous to take an appropriate countermeasure against the speckle noise.

Third Example of Configuration of Video Projection Apparatus

Figure 13:
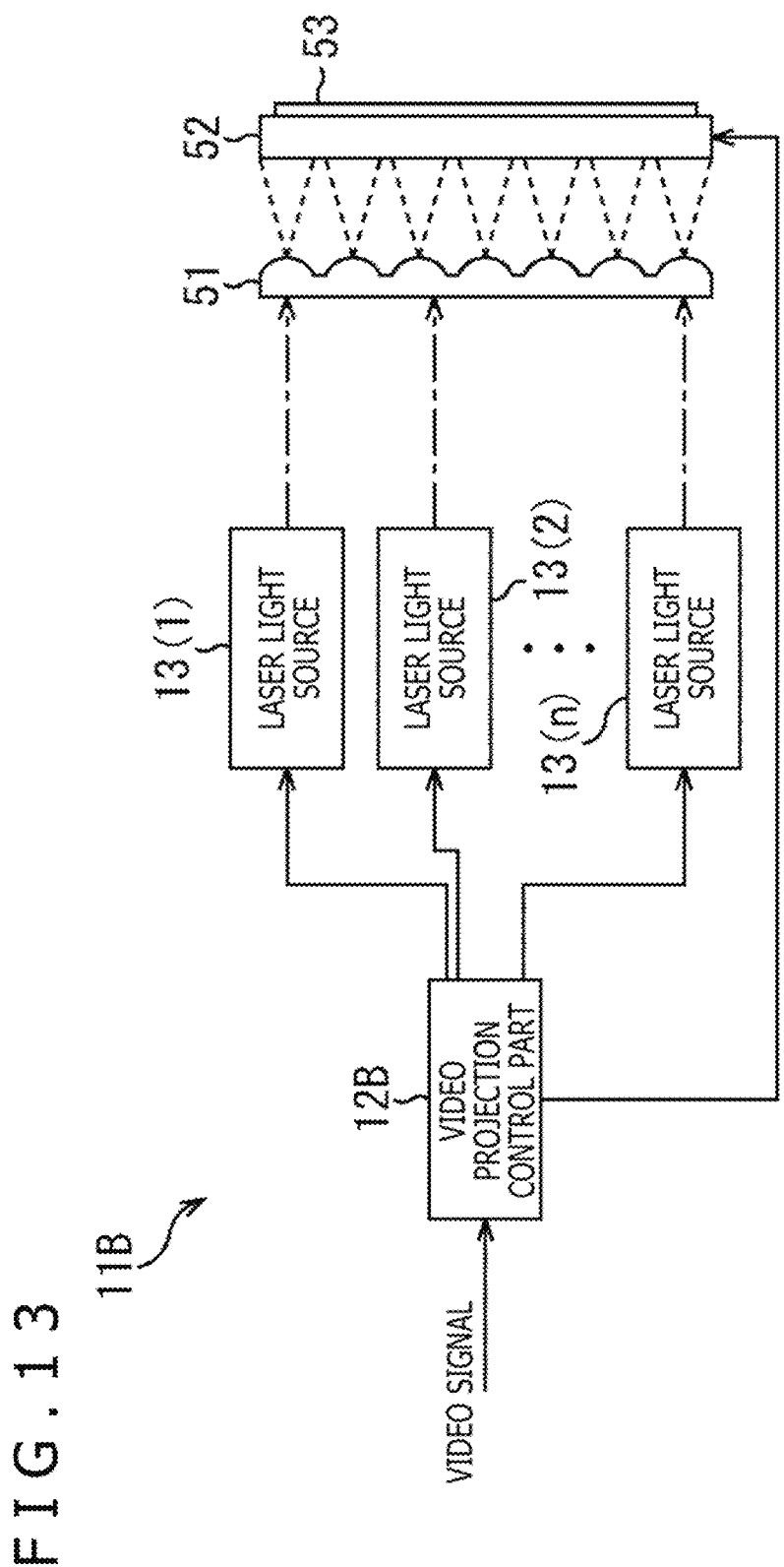
FIG. 13 is a block diagram depicting an example of a configuration of a third embodiment of the video projection apparatus.

FIG. 13 is a block diagram depicting an example of a configuration of a third embodiment of the video projection apparatus to which the present technique is applied.

As depicted in FIG. 13, a video projection apparatus 11B is a what-is-called laser light source display and includes a video projection control part 12B, laser light sources 13(1) to 13(n), a diffusing lens 51, a liquid crystal panel 52, and a color filter 53.

The video projection control part 12B controls the emission intensity of the laser beams output from the laser light sources 13(1) to 13(n) in accordance with the brightness of input video that is video reproduced by an external reproduction apparatus not depicted and input thereinto, and controls the driving of each pixel of the liquid crystal panel 52 in accordance with the input video.

The laser light sources 13(1) to 13(n) output laser beams that are, for example, white laser beams each having the light beams of all the wavelength regions mixed therein, to be used as the illumination to project the video by the video projection apparatus 11B. Moreover, similar to the laser light sources 13-1 to 13-3 in FIG. 1, the laser light sources 13(1) to 13(n) each have a property that the wavelength of the laser beam output therefrom varies (wavelength-shifts) in accordance with the emission intensity employed when the laser beam is emitted.

The diffusing lens 51 diffuses the laser beams output from the laser light sources 13(1) to 13(n) such that the laser beams planarly enter into the liquid crystal panel 52.

The liquid crystal panel 52 is a modulation element including a liquid crystal element that adjusts the transmission amount of the light to be transmitted, which is disposed therein for each pixel included in the video projected by the video projection control part 12B. For example, the laser beams diffused by the diffusing lens 51 planarly enter into the back face of the liquid crystal panel 52, the laser beams are modulated by the liquid crystal elements, and thereby the video by the luminance is displayed on the surface of the liquid crystal panel 52.

The color filter 53 includes filters that transmit therethrough light beams of, for example, a red color, a green color, and a blue color, which are disposed in accordance with, for example, the Bayer array for each pixel of the liquid crystal panel 52.

In addition, for each of divided areas formed by dividing the video to be projected into n areas, the video projection apparatus 11B can control the brightness of each of the divided areas, using the laser beam output from each of the laser light sources 13(1) to 13(n). The video projection apparatus 11B cab thereby display higher-contrast video.

In the video projection apparatus 11B configured as above, the video projection control part 12B generates the wavelength shift in each of the laser light sources 13(1) to 13(n) for each frame of the video and, similar to the video projection apparatus 11 in FIG. 1, the reduction of the speckle noise can thereby be facilitated.

Third Example of Configuration of Video Projection Control Part

Figure 14:
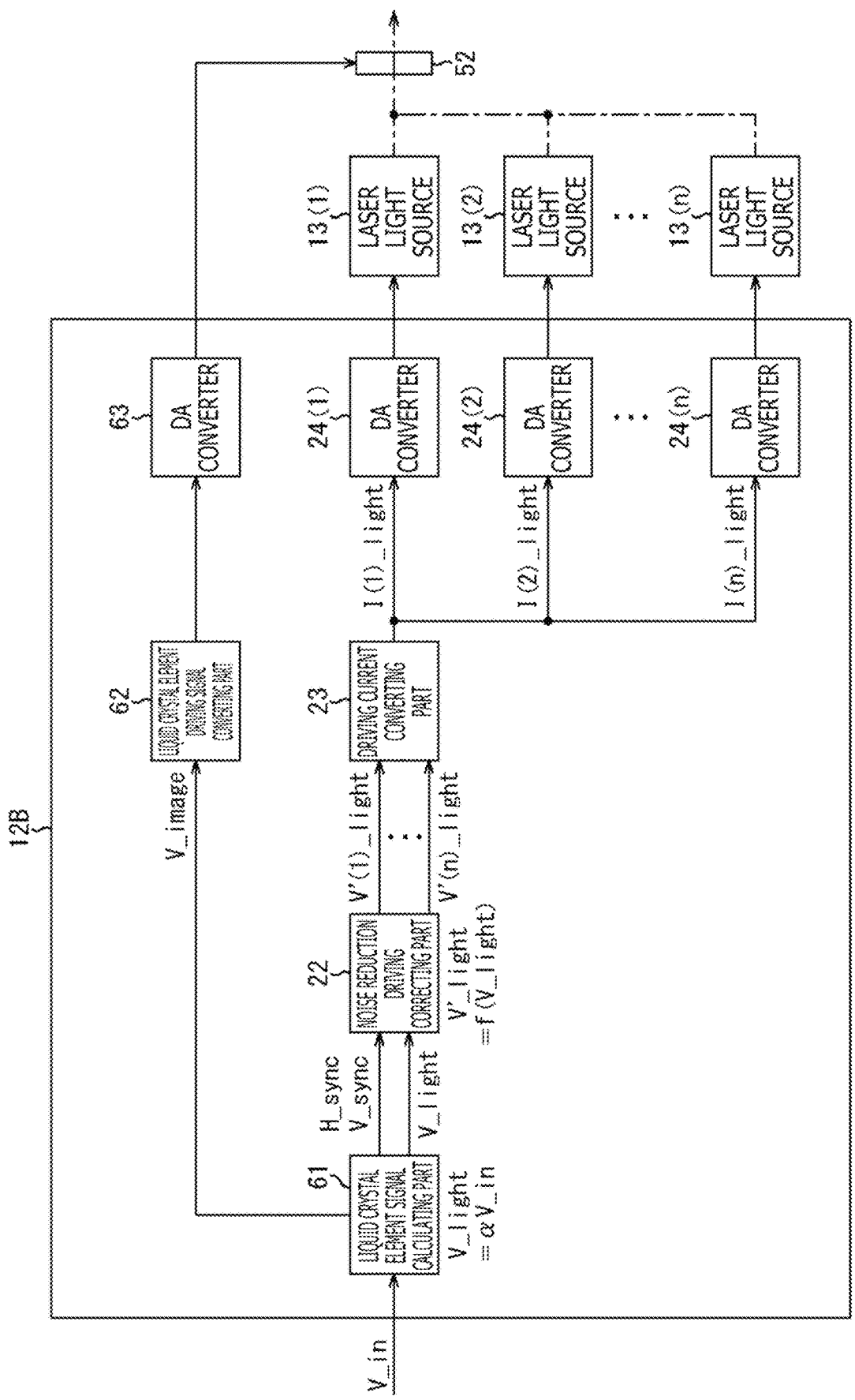
FIG. 14 is a block diagram depicting a third example of the configuration of the video projection control part.

FIG. 14 is a block diagram depicting an example of the configuration of the video projection control part 12B depicted in FIG. 13. In addition, in the video projection control part 12B depicted in FIG. 14, the blocks thereof that are common to the video projection control part 12 in FIG. 9 will not again be described in detail.

In other words, similar to the video projection control part 12 in FIG. 9, the video projection control part 12B includes the noise reduction driving correcting part 22, the driving current converting part 23, and DA converters 24(1) to 24(n). Furthermore, the video projection control part 12A includes a liquid crystal element signal calculating part 61, a liquid crystal element driving signal converting part 62, and a DA converter 63.

The liquid crystal element signal calculating part 61 acquires liquid crystal element data V_image to express the input video using the liquid crystal panel 52, from the video pixel data V_in of each one pixel included in the input video input into the video projection control part 12B, and supplies the liquid crystal element data V_image to the liquid crystal element driving signal converting part 62. Moreover, the liquid crystal element signal calculating part 61 calculates light source output data V_light in accordance with the brightness of the overall one frame of the input video, from the video pixel data V_in of each one pixel included in the input video input into the video projection control part 12B (V_light=α×V_in). The liquid crystal element signal calculating part 61 thereafter supplies the vertical synchronization signal V_sync and the horizontal synchronization signal H_sync of the input video together with the light source output data V_light to the noise reduction driving correcting part 22.

The liquid crystal element driving signal converting part 62 converts the liquid crystal element data V_image supplied from the liquid crystal element signal calculating part 61 into driving signal data to drive the modulation element 32, and supplies the driving signal data to the DA converter 63. The DA converter 43 thereafter converts the driving signal data supplied from the liquid crystal element driving signal converting part 62 as a digital value into analog data, and supplies a driving signal at a voltage indicated by the driving signal data to the liquid crystal panel 52.

Moreover, in the video projection control part 12B, the noise reduction driving correcting part 22 applies modulation driving correction to generate the wavelength shift that reduces the speckle noise as described above, to the light source output data V_light supplied thereto from the liquid crystal element signal calculating part (V'_light=f(V_light)). At this time, the noise reduction driving correcting part 22 acquires pieces of corrected light source output data V'(1)_light to V'(n)_light respectively for the divided areas for which the laser light sources 13(1) to 13(n) respectively act as the light sources. The noise reduction driving correcting part 22 thereafter supplies the corrected light source output data V'_light to which the modulation driving correction is applied, to the driving current converting part 23.

In the video projection control part 12B, the wavelength shift can be generated for each one frame as a unit, and the noise reduction driving correcting part 22 executes the modulation driving correction that converts the light source output data V_light into the corrected light source output data V'_light using coefficients coeff1 and coeff2 as represented in Equation (5) below. At this time, such coefficients are used as the coefficient coeff1 and the coefficient coeff2 with which the video is projected for which the emission intensity acquired when the frames are temporarily overlapped on each other corresponds to the brightness based on the input video (that is, (V×coeff1+V×coeff2)/2=V).

[Math. 5]

$$V'\_light = \begin{cases} V\_light \times coeff1 & \text{for an odd frame of each light source} \\ V\_light \times coeff2 & \text{for an even frame of each light source} \end{cases} \quad (5)$$

In this regard, (V×coeff1+V×coeff2)/2=V

The pieces of corrected light source output data V'(1)_light to V'(n)_light are thereafter converted into pieces of electric current data of the driving currents I(1)_light to I(n)_light by the driving current converting part 23, and the pieces of electric current data are respectively converted into pieces of analog data by the DA converters 24(1) to 24(n). The driving currents I_light in the current amounts indicated by the pieces of current data are supplied to the laser light sources 13(1) to 13(n).

The video projection control part 12B is configured as above, and can supply the driving currents I(1)_light to I(n)_light that are corrected such that the wavelength shift is generated by the noise reduction driving correcting part 22B, to the laser light sources 13(1) to 13(n). The video projection control part 12B can thereby generate the wavelength shift for each frame of the video and, similar to the video projection control part 12, can facilitate reduction of the speckle noise.

Furthermore, the noise reduction driving correcting part 22B may generate the wavelength shift using a correction amount that is different for each of the laser light sources 13(1) to 13(n), that is, for each of divided areas formed by dividing the video into a plurality of areas. In this case, reduction of the speckle noise can be facilitated by overlapping in the spatial direction of the video.

In addition, in the case where the wavelength shift is generated for each frame of the video as above, for example, modulation at 30 Hz or higher is desirable considering the temporal resolution of the human eye and flickering caused by a flicker can be more suppressed as the frequency is increased. Moreover, as described above, also in the video projection control part 12B, the generation of the wavelength shift in patterns from two patterns to eight patterns is advantageous to take an appropriate countermeasure against the speckle noise.

The video projection apparatuses 11A to 11C configured as above each can achieve the effect of reducing the speckle noise by, for example, causing one laser beam to have the wavelength shift therein, generating thereby different interference patterns, and superimposing these interference patterns spatially or temporarily on each other. The sense of resolution of the projected video can thereby be improved and the eye-friendliness of characters and a flat (solidly coated) video can be improved.

Furthermore, a further effect of reducing the speckle noise can be expected, by executing the modulation using a plurality of laser beams having different wavelengths.

Figure 15:
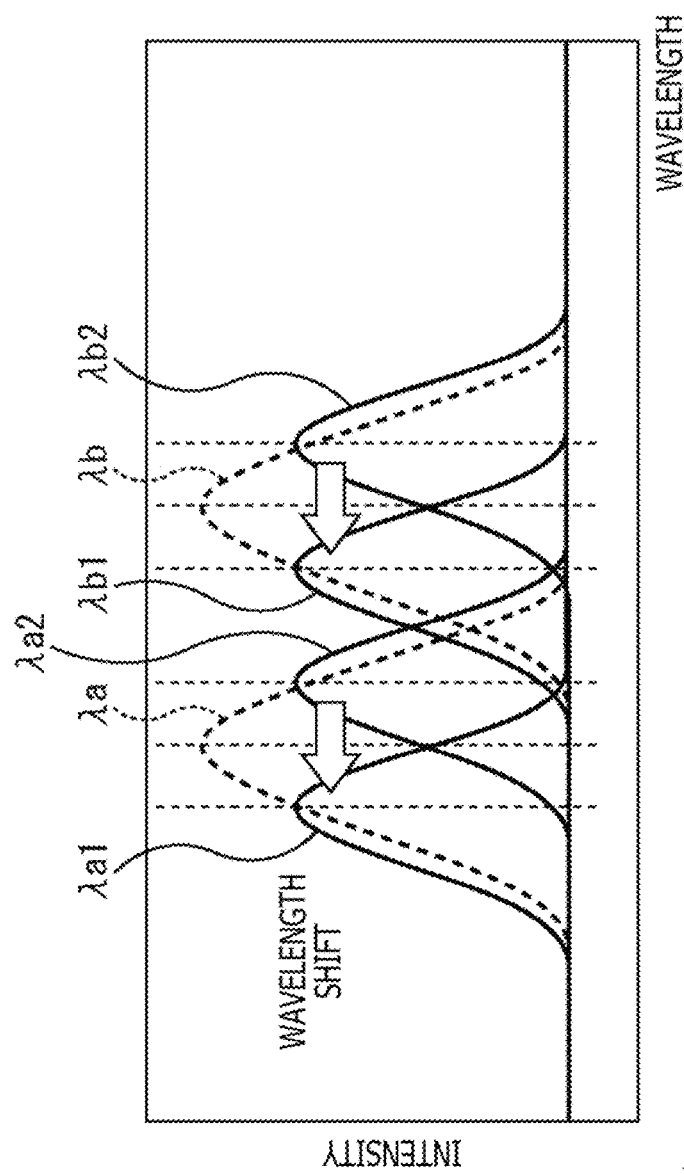
FIG. 15 is a diagram explaining a wavelength shift generated when two laser beams are used.

For example, as depicted in FIG. 15, using a laser beam having a wavelength $\lambda a$ and a laser beam having a wavelength $\lambda b$, four interference patterns having a wavelength $\lambda a1$, a wavelength $\lambda a2$, a wavelength $\lambda b1$, and a wavelength $\lambda b2$ can be superimposed on each other by causing the above two laser beams to be frequency-shifted. Reduction of the speckle noise of, for example, "$1/\sqrt{\text{the number of interference patterns}}$" can be expected, by increasing the number of interference patterns as above.

Example of Configuration of Computer

In addition, the processes described with reference to the flowchart described above are not necessarily processed in the chronological order along the order described as the flowchart, and also include processes to be executed in parallel to each other or each separately from each other (that is, for example, parallel processing or processing by an object). Moreover, a program may be a program to be processed by one CPU or may be a program to be distributed-processed by a plurality of CPUs.

Moreover, the series of processes described above (the video projection control method) can be executed by hardware or can be executed by software. In a case where the series of processes are executed by software, the program included in the software is installed, from a program recording medium having the program recorded therein, in a general-purpose personal computer or the like capable of executing various types of function, for example, by installing a computer incorporated in dedicated hardware or various types of programs.

Figure 16:
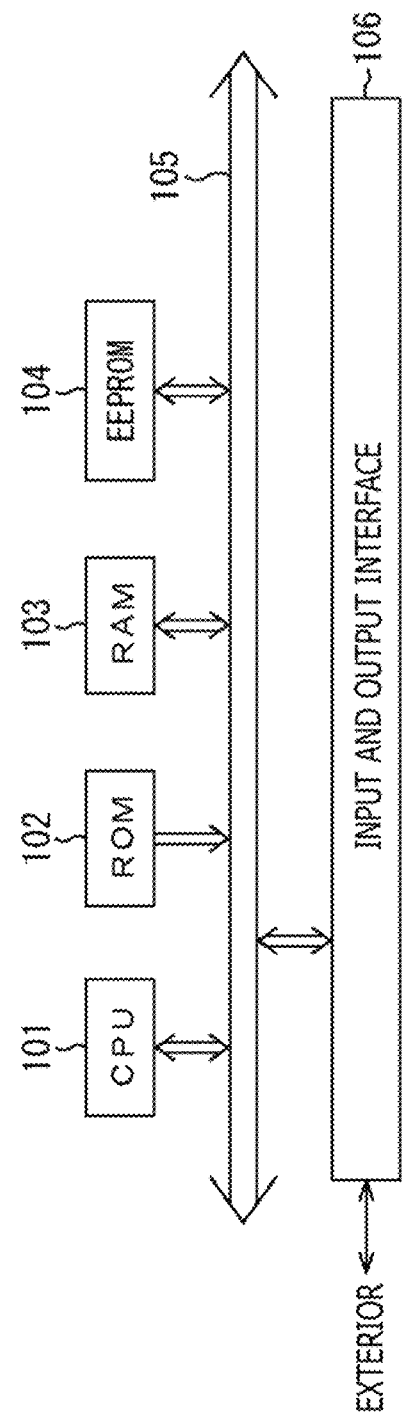
FIG. 16 is a block diagram depicting an example of a configuration of an embodiment of a computer to which the present technique is applied.

FIG. 16 is a block diagram depicting an example of a configuration of hardware of a computer that executes the series of processes described above by the program.

In the computer, a CPU (Central Processing Unit) 101, a ROM (Read Only Memory) 102, a RAM (Random Access Memory) 103, and an EEPROM (Electronically Erasable and Programmable Read Only Memory) 104 are connected to each other by a bus 105. An input and output interface 106 is further connected to the bus 105, and the input and output interface 106 is connected to the exterior.

In the computer configured as above, the CPU 101 loads, for example, programs stored in the ROM 102 and the EEPROM 104 onto the RAM 103 through the bus 105 and executes the programs, and the above-described series of processes are thereby executed. Moreover, the programs executed by the computer (the CPU 101) can be written in the ROM 102 in advance or, in addition, can be installed or updated in the EEPROM 104 from the exterior through the input and output interface 106.

Examples of Combination of Configurations

In addition, the present technique can also take the following configurations.

(1)

A video projection control apparatus including:

a calculating part that calculates projection signal data to project video for projection using, as a light source, a laser beam output from a laser light source, from video signal data of input video, the laser light source having a property that a wavelength shifts in accordance with an emission intensity employed when the laser beam is emitted;

a correcting part that applies, to the projection signal data, a correction process of shifting the wavelength of the laser beam in a predetermined modulation unit; and a converting part that converts the projection signal data to which the correction process is applied into electric current data of a driving current to be supplied to the laser light source.

(2)

The video projection control apparatus described in the above (1), in which the correcting part executes the correction process for the projection signal data using a correction amount for each modulation unit, the modulation unit being set such that, when the wavelength of the laser beam is cyclically shifted in the modulation unit, an average of the emission intensity of the laser beam per one cycle corresponds to brightness of the input video.

(3)

The video projection control apparatus described in the above (1) or (2), in which the correcting part applies the correction process to the projection signal data using a correction amount with which the emission intensity of the laser beam varied by the correction process stays in a predetermined range relative to brightness of the input video.

(4)

The video projection control apparatus described in any one of the above (1) to (3), in which the correcting part executes the correction process for the projection signal data setting, when the wavelength of the laser beam is cyclically shifted in the modulation unit, patterns for the wavelength of the laser beam to be shifted therein in one cycle of the shifting, to be two patterns to eight patterns.

(5)

The video projection control apparatus described in any one of the above (1) to (4), in which the number of the laser beam that is output with its wavelength shifted, as a light source to project the video for projection is one.

(6)

The video projection control apparatus described in any one of the above (1) to (5), in which the video for projection is drawn by causing the laser beam to scan on a projection surface onto which the laser beam output from the laser light source is projected, and the calculating part calculates scanning pixel data for each one pixel of the video for projection in accordance with the scanning by the laser beam, as the projection signal data.

(7)

The video projection control apparatus described in the above (6), in which the correcting part shifts the wavelength of the laser beam using, as the modulation unit, one drawing clock to draw one pixel of the video for projection by causing the laser beam to scan.

(8)

The video projection control apparatus described in the above (6), in which the correcting part shifts the wavelength of the laser beam using, as the modulation unit, one drawing line to draw one pixel of the video for projection by causing the laser beam to scan.

(9)

The video projection control apparatus described in the above (8), in which the correcting part switches a correction amount by which the wavelength of the laser beam is shifted for one predetermined drawing line, for each frame of the video for projection.

(10)

The video projection control apparatus described in the above (6), in which the correcting part shifts the wavelength of the laser beam using each one frame of the video for projection as the modulation unit.

(11)

The video projection control apparatus described in any one of the above (1) to (5), in which the video for projection is displayed on the projection surface by diffusing the laser beam output from the laser light source by a diffusing lens, using a modulation element, modulating the laser beam diffused by the diffusing lens and entering planarly thereinto, for each pixel of the video for projection, and condensing the planar laser beam transmitted through the modulation element using a projecting lens and thereafter causing the laser beam to provide an image on a projection surface, and the calculating part calculates, as the video signal data, modulation element data to express the input video using the modulation element and light source output data to cause the laser light source to output the laser beam in accordance with brightness of the input video.

(12)

The video projection control apparatus described in the above (11), in which the correcting part shifts the wavelength of the laser beam using each one frame of the video for projection as the modulation unit.

(13)

The video projection control apparatus described in any one of the above (1) to (5), in which the video for projection is displayed on a surface of the modulation element by diffusing the laser beam output from the laser light source by a diffusing lens, and projecting the laser beam onto a back face of a modulation element that modulates the laser beam diffused by the diffusing lens and entering planarly, for each pixel of the video for projection, and the calculating part calculates, as the video signal data, modulation element data to express the input video using the modulation element and light source output data to cause the laser light source to output the laser beam in accordance with brightness of the input video.

(14)

The video projection control apparatus described in the above (13), in which the correcting part shifts the wavelength of the laser beam using each one frame of the video for projection as the modulation unit.

(15)

The video projection control apparatus described in any one of those up to the above (13) or (14), further including:

a predetermined number of the laser light sources, in which brightness of the video for projection is controlled by the laser beam output from each of the predetermined number of the laser light sources for each of divided areas formed by dividing the video for projection into a predetermined number of areas.

(16)

A video projection control method including:

by a video projection control apparatus that projects video, calculating projection signal data to project video for projection using, as a light source, a laser beam output from a laser light source, from video signal data of input video, the laser light source having a property that a wavelength shifts in accordance with an emission intensity employed when the laser beam is emitted;

applying, to the projection signal data, a correction process of shifting the wavelength of the laser beam in a predetermined modulation unit; and converting the projection signal data to which the correction process is applied into electric current data of a driving current to be supplied to the laser light source.

(17)

A program causing a computer of a video projection control apparatus that projects video, to execute video projection control including:

calculating projection signal data to project video for projection using, as a light source, a laser beam output from a laser light source, from video signal data of input video, the laser light source having a property that a wavelength shifts in accordance with an emission intensity employed when the laser beam is emitted;

applying, to the projection signal data, a correction process of shifting the wavelength of the laser beam in a predetermined modulation unit; and converting the projection signal data to which the correction process is applied into electric current data of a driving current to be supplied to the laser light source.

(18)

A video projection apparatus including:

a laser light source that has a property that a wavelength shifts in accordance with an emission intensity employed when a laser beam is emitted;

a calculating part that calculates projection signal data to project video for projection using, as a light source, the laser beam output from the laser light source, from video signal data of input video;

a correcting part that applies, to the projection signal data, a correction process of shifting the wavelength of the laser beam in a predetermined modulation unit; and a converting part that converts the projection signal data to which the correction process is applied into electric current data of a driving current to be supplied to the laser light source.

(19)

The video projection apparatus described in the above (18), further including:

a scanning part that draws the video for projection by causing the laser beam to scan on a projection surface onto which the laser beam output from the laser light source is projected.

(20)

The video projection apparatus described in the above (18), further including:

a diffusing lens that diffuses the laser beam output from the laser light source; and a modulation element that modulates the laser beam diffused by the diffusing lens and entering planarly thereinto, for each pixel of the video for projection.

In addition, this embodiment is not limited to the embodiments described above and various changes can be made thereto within the scope not departing from the gist of the present disclosure. Moreover, the effect described herein is absolutely exemplification and is not limited, and other effects may be achieved.

REFERENCE SIGNS LIST

11 Video projection apparatus, 12 Video projection control part, 13 Laser light source, 14 Mirror, 15 Dichroic mirror, 16 MEMS mirror, 21 Scanning signal calculating part, 22 Noise reduction driving correcting part, 23 Driving current converting part, 24 DA converter, 31 Diffusing lens, 32 Modulation element, 33 Projecting lens, 41 Modulation element signal calculating part, 42 Modulation element driving signal converting part, 43 DA converter, 51 Diffusing lens, 52 Liquid crystal panel, 53 Color filter, 61 Liquid crystal element signal calculating part, 62 Liquid crystal element driving signal converting part, 63 DA converter

What is claimed is:

1. A video projection control apparatus comprising:

a calculating part that calculates projection signal data to project video for projection using, as a light source, a laser beam output from a laser light source, from video signal data of input video, the laser light source having a property that a wavelength shifts in accordance with an emission intensity employed when the laser beam is emitted;

a correcting part that applies, to the projection signal data, a correction process of shifting the wavelength of the laser beam in a predetermined modulation unit, wherein the predetermined modulation unit includes a 70% wavelength shift for an odd-numbered frame and a 130% wavelength shift for an even-numbered frame; and a converting part that converts the projection signal data to which the correction process is applied into electric current data of a driving current to be supplied to the laser light source.

2. The video projection control apparatus according to claim 1, wherein the correcting part executes the correction process for the projection signal data using a correction amount for each modulation unit, the modulation unit being set such that, when the wavelength of the laser beam is cyclically shifted in the modulation unit, an average of the emission intensity of the laser beam per one cycle corresponds to brightness of the input video.

3. The video projection control apparatus according to claim 1, wherein the correcting part applies the correction process to the projection signal data using a correction amount with which the emission intensity of the laser beam varied by the correction process stays in a predetermined range relative to brightness of the input video.

4. The video projection control apparatus according to claim 1, wherein the correcting part executes the correction process for the projection signal data setting, when the wavelength of the laser beam is cyclically shifted in the modulation unit, patterns for the wavelength of the laser beam to be shifted therein in one cycle of the shifting, to be two patterns to eight patterns.

5. The video projection control apparatus according to claim 1, wherein the number of the laser beam that is output with its wavelength shifted, as a light source to project the video for projection is one.

6. The video projection control apparatus according to claim 1, wherein the video for projection is drawn by causing the laser beam to scan on a projection surface onto which the laser beam output from the laser light source is projected, and the calculating part calculates scanning pixel data for each one pixel of the video for projection in accordance with the scanning by the laser beam, as the projection signal data.

7. The video projection control apparatus according to claim 6, wherein the correcting part shifts the wavelength of the laser beam using, as the modulation unit, one drawing clock to draw one pixel of the video for projection by causing the laser beam to scan.

8. The video projection control apparatus according to claim 6, wherein the correcting part shifts the wavelength of the laser beam using, as the modulation unit, one drawing line to draw one pixel of the video for projection by causing the laser beam to scan.

9. The video projection control apparatus according to claim 8, wherein the correcting part switches a correction amount by which the wavelength of the laser beam is shifted for one predetermined drawing line, for each frame of the video for projection.

10. The video projection control apparatus according to claim 6, wherein the correcting part shifts the wavelength of the laser beam using each one frame of the video for projection as the modulation unit.

11. The video projection control apparatus according to claim 1, wherein the video for projection is displayed on the projection surface by
    diffusing the laser beam output from the laser light source by a diffusing lens,
    using a modulation element, modulating the laser beam diffused by the diffusing lens and entering planarly thereinto, for each pixel of the video for projection, and
    condensing the planar laser beam transmitted through the modulation element using a projecting lens and thereafter causing the laser beam to provide an image on a projection surface, and
    the calculating part calculates, as the video signal data, modulation element data to express the input video using the modulation element and light source output data to cause the laser light source to output the laser beam in accordance with brightness of the input video.

12. The video projection control apparatus according to claim 11, wherein the correcting part shifts the wavelength of the laser beam using each one frame of the video for projection as the modulation unit.

13. The video projection control apparatus according to claim 1, wherein the video for projection is displayed on a surface of the modulation element by
    diffusing the laser beam output from the laser light source by a diffusing lens, and
    projecting the laser beam onto a back face of a modulation element that modulates the laser beam diffused by the diffusing lens and entering planarly, for each pixel of the video for projection, and
    the calculating part calculates, as the video signal data, modulation element data to express the input video using the modulation element and light source output data to cause the laser light source to output the laser beam in accordance with brightness of the input video.

14. The video projection control apparatus according to claim 13, wherein the correcting part shifts the wavelength of the laser beam using each one frame of the video for projection as the modulation unit.

15. The video projection control apparatus according to claim 13, further comprising:
    a predetermined number of the laser light sources,
    wherein brightness of the video for projection is controlled by the laser beam output from each of the predetermined number of the laser light sources for each of divided areas formed by dividing the video for projection into a predetermined number of areas.

16. A video projection control method performed by a video projection control apparatus that projects video, comprising:
    calculating projection signal data to project video for projection using, as a light source, a laser beam output from a laser light source, from video signal data of input video, the laser light source having a property that a wavelength shifts in accordance with an emission intensity employed when the laser beam is emitted;
    applying, to the projection signal data, a correction process of shifting the wavelength of the laser beam in a predetermined modulation unit,
        wherein the predetermined modulation unit includes a 70% wavelength shift for an odd-numbered frame and a 130% wavelength shift for an even-numbered frame; and
    converting the projection signal data to which the correction process is applied into electric current data of a driving current to be supplied to the laser light source.

17. A non-transitory computer-readable medium storing instruction that when executed by a computer of a video projection control apparatus, causes the computer to perform a noise reduction method by:
    calculating projection signal data to project video for projection using, as a light source, a laser beam output from a laser light source, from video signal data of input video, the laser light source having a property that a wavelength shifts in accordance with an emission intensity employed when the laser beam is emitted;
    applying, to the projection signal data, a correction process of shifting the wavelength of the laser beam in a predetermined modulation unit, wherein the predetermined modulation unit includes a 70% wavelength shift for an odd-numbered frame and a 130% wavelength shift for an even-numbered frame; and converting the projection signal data to which the correction process is applied into electric current data of a driving current to be supplied to the laser light source.

* * * * *